United States Patent [19]

Hoeft

[11] Patent Number: 4,888,913
[45] Date of Patent: Dec. 26, 1989

[54] PLASTIC FILM FEEDING MACHINE, AS USED IN AGRICULTURE

[75] Inventor: Benoit Hoeft, Kaysersberg, France

[73] Assignee: Kaysersberg S.A., Kaysersberg, France

[21] Appl. No.: 154,586

[22] Filed: Feb. 10, 1988

[30] Foreign Application Priority Data

Feb. 17, 1987 [FR] France ................................. 87 02047

[51] Int. Cl.⁴ .............................................. A01G 7/00
[52] U.S. Cl. ............................................ 47/9; 111/200
[58] Field of Search ............................. 47/9; 111/2, 3

[56] References Cited

U.S. PATENT DOCUMENTS 4,771,570 9/1988 Nyboer ..................................... 47/9

FOREIGN PATENT DOCUMENTS 2452871 10/1980 France ..................................... 47/9
596748 3/1978 Switzerland ............................. 47/9

Primary Examiner—Robert A. Hafer
Assistant Examiner—Lynda M. Cofsky
Attorney, Agent, or Firm—A. W. Breiner

[57] ABSTRACT

A machine for laying plastic film on a substrate which comprises supporting rollers (32 to 37) on which drum (16) is placed. One of the chassis wheels (6, 8) drives the drum through a transmission system (40) including a mechanical variable speed drive (60) enabling the transmission ratio between the traction wheel and the drum drive rollers to be varied. It is thereby possible to limit the tension forces exerted on the film when laying the film, making it possible to adapt the film to an uneven substrate, such as furrows or ridges on the ground in agricultural uses.

7 Claims, 4 Drawing Sheets

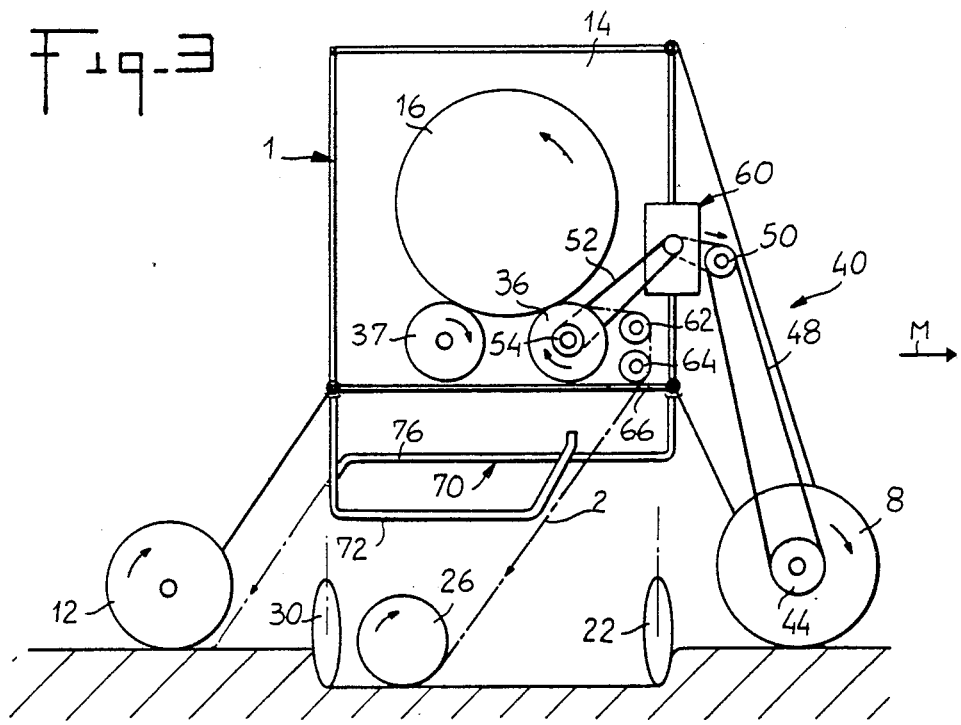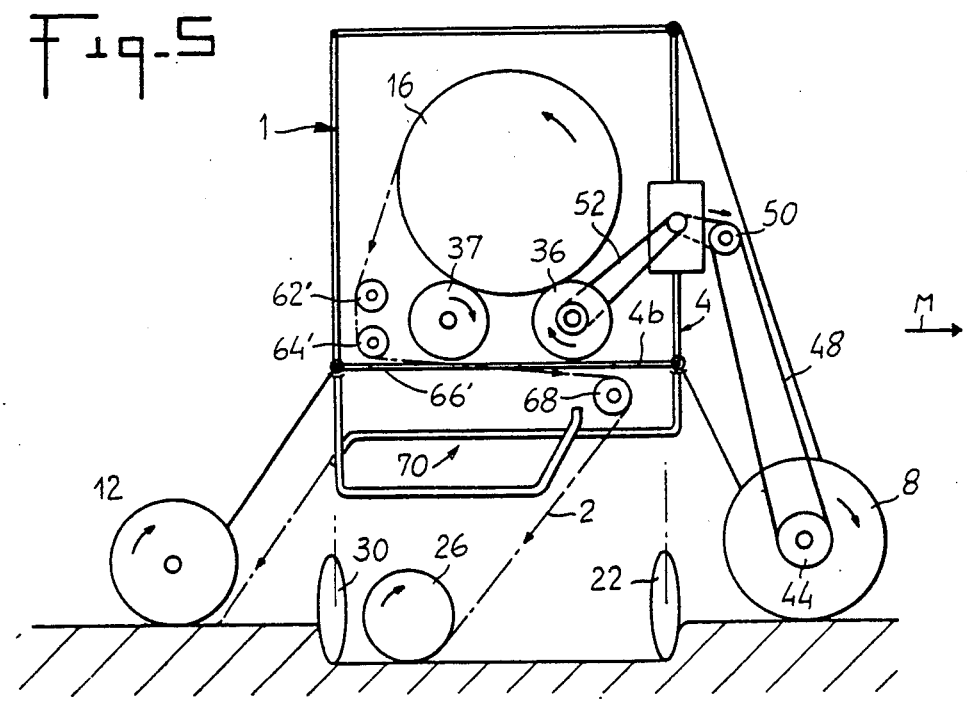

PLASTIC FILM FEEDING MACHINE, AS USED IN AGRICULTURE

FIELD OF THE INVENTION

Essentially, the present invention concerns a machine for the feeding of a plastic film used in agriculture, and in particular in market gardening, using a film storage or feed drum, driven in rotation by some of the drum supporting rollers, which behave as drive rollers.

BACKGROUND OF INVENTION

Document FR-A-No. 2 235 642 already describes a plastic film feeding machine used in agriculture, in flat market gardening, or in vine cultivation.

A machine of this type is intended to be pulled by a traction machine, such as a tractor, and consists of:

a wheel-mounted chassis, forming a box structure, preferably with at least four wheels, the film storage device being inside and/or outside the said structure, and preferaby comprising a film storage or feed spool mounted so as to rotate with respect to the chassis;

devices for unwinding or feeding the film from the said film storage or feed drum, by rotating the said drum;

devices for opening a furrow in the ground at each end of the said film devices for maintaining the edges of the film within the said formed furrows, and which may include sealing wheels; and devices for burying the film maintained in each furrow formed.

With a machine of this type, the film is drawn from the film storage or feed drum by the sealing wheels, drawing or pulling of the film giving rise to problems of irregularity of tension, while at the same time it is necessary to prevent the formation of folds.

Now, in some cases, it is necessary that folds be formed in order to adapt the film to the shape of the furrow or ridge. In addition, the tension applied to the film must not be too high, but, on the contrary, as low as possible, which cannot be achieved if the film is pulled or drawn by the sealing wheels.

Similarly, document FR-A-No. 2 452 871 describes an agricultural coating machine of similar design, in which the film is extracted from the storage drum by means of two band pressor devices, which form the film drawing or pulling system.

OBJECTS OF INVENTION

Therefore, this invention is intended to resolve the new technical problem, which consists in the provision of the solution, not only enabling the film to be drawn, but, on the contrary, to deposit it on the ground, while at the same time varying the film feed speed as desired with respect to the machine speed.

Furthermore, this invention is intended to resolve the new technical problem consisting in the provision of a solution enabing feeding of a film, with formation of folds as desired.

Also, the present invention is intended to resolve the new technical problem consisting in the provision of a solution enabling feeding of a film of very wide width, for example equal to several meters, and in particular at least equal to 5 or 6 meters, while enabling the spread of the film to be altered as desired.

Although of particularly simple design, the present invention resolves these new technical problems satisfactorily, for the first time.

GENERAL DESCRIPTION OF INVENTION

This invention concerns a plastic film feeding machine used in agriculture, and especially in market gardening, intended to be towed by a traction device, such as a tractor, and consisting of a chassis forming a box structure, preferably mounted on four wheels, film storage or feed devies being provided within the said box structure, and preferably comprising a film feed or storage drum which rotates with respect to the chassis; film feed devices from the said film storage or feed drum, by rotation of the drum itself, devices for opening a furrow in the ground, at each side of the said film, devices for keeping the edges of the film inside each furrow formed, which may consist of a sealing wheel, and devices for burying the film maintained in each formed furrow, such that the said drum is capable of rotating on supporting rollers; at least one of the chassis support wheels, and preferably at least one of the chassis front wheels, in the towing direction, forms a traction wheel which drives some of the drum supporting rollers through a drive transmission system comprising a mechanical variable speed drive, which enables the transmission ratio between the traction wheel and the drum drive rollers to be varied.

According to a preferred design method, at least two of the chassis front wheels, at each end of the chassis, form the traction wheels. Preferably, both traction wheels drive an intermediate common shaft, appropriately splined, which in turn drives the drum drive rollers.

According to another particularly advantageous design method, this machine is characterized by the fact that it comprises devices for folding the film in the crosswise direction, thus enabling slack to be given to the film, while in turn enabling raising of plants, and in particular cereals. Preferably, these holding devices are located under the chassis, and preferably consist of a set of at least three angle-edge relieving tubes to prevent the film tearing, one tube being located at a higher level and opposite the two other tubes, as near as possible to the point of arrival of the film.

According to another special design method, this machine comprises device for displacement of all the devices, such as to alter the spread of the film, preferably by raising the traction and sealing wheels, the folding system, where fitted, and the burying equipment, onto a fitted carriage which can be moved transversally along a guide.

According to another special design method, this machine comprises film turnover or transfer tubes or rollers, located up-system from the supporting and/or drive rollers, with respect to the direction of movement of the film.

According to another design option, this machine comprises twisting or return rollers located down-system from the supporting and/or drive rollers, with respect to the direction of movement of the film.

From the above, it can be seen that a machine is obtained which is capable of depositing the film, whatever its width, and such that the machine forward speed is synchronized with the film feed speed, this machine being of particularly simple design.

In addition, the presence of a mechanical variable speed drive enables the film tension to be adjusted to the condition of the drum and the conformation of the terrain.

When it is deposited, the film is subjected to low tension, and can be adapted as desired to the shape of a channel or ridge, and this whatever the film width.

In addition, according to the present invention, folds can be made in the film due to folding devices which are advantageously located as near as possible to the sealing wheels, in this case under the chassis, so as not to deform the film, and enable it to be taken to the sealing wheels. Preferably, these film folding devices are also installed on the transversally movable carriage mounted on a guide.

In this manner, a simplified mechanical system is obtained enabling the spread of the film to be altered as desired, whatever the width of the film.

According to another preferred feature, each traction wheel is located along the axis of the device opening the furrow in the ground, such as an opening disk, which enables a reduction in lateral dimensions, and the earth in front of the disk to be packed, thus facilitating opening of the furrow.

Moreover, this machine is designed with wheel supporting devices, offering high ground clearance for the machine.

It will also be understood that the invention is such that a film feeding machine offering a clear technical advance, totally unexpected by a craftsman, is obtained.

It should be noted that the term "film" or "plastic film" covers all products which may be presented in the form of continuous bands of consequent length. Naturally, this includes films containing orifices or cutouts, which may present themselves after unrolling of the film, with openings which give the resemblance of a net or similar device. Similarly, the film may be of any type, but it is agreed that it must be adapted to the application envisaged, which is fully within the capacities of a craftsman.

THE DRAWINGS

Other objectives, characteristics and advantages of the invention will appear more clearly in the light of the description to follow, and which refers to appended drawings representing the invention design method at present preferred, and according to two main options, which are given for illustrative purposes only, and which therefore cannot, in any way, limit the range of the invention. In the drawings:

FIG. 3 is an elevation, lateral view, as a partial cross-section of the machine shown in FIG. 1, according to the first design option.

FIG. 5 represents a view similar to that of FIG. 3, for a second design option; and, FIG. 6 gives a detailed and large view of the devices enabling modification of the spread, by means of a carriage which can be moved crosswise along a guide rail.

Figure 1:
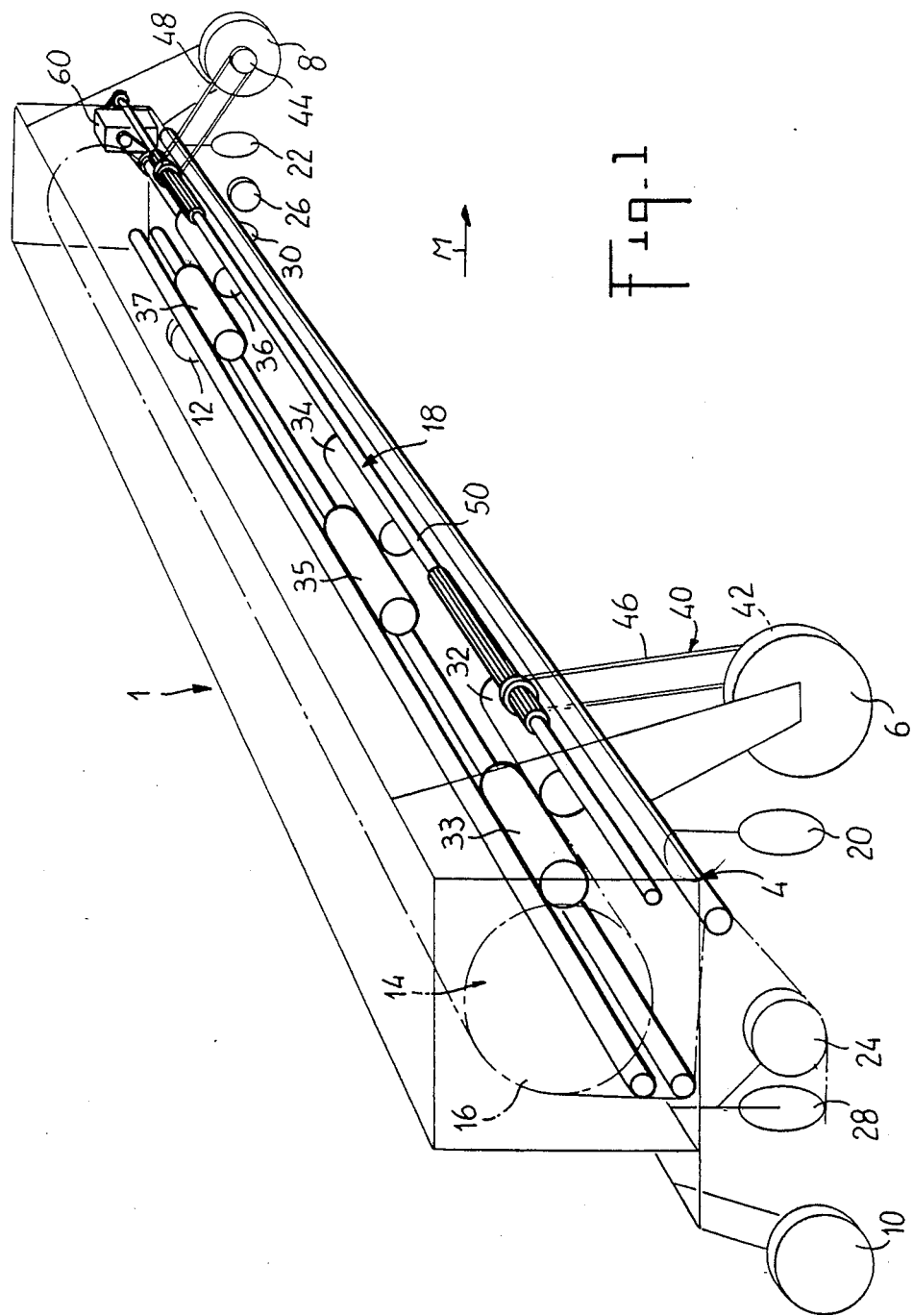
FIG. 1 is a schematic perspective view of the design method as at present preferred, for a film feed machine, according to the present invention and showing the essential devices or components.
Figure 2:
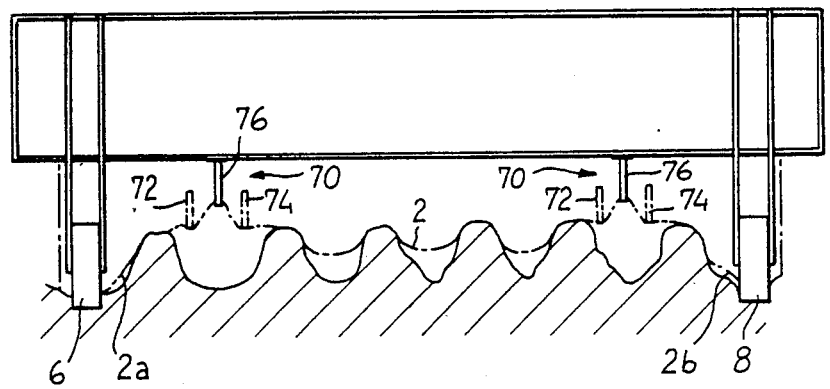
FIG. 2 is a front elevation view, also schematic, of the machine shown in FIG. 1.

In particular, and referring to FIGS. 1 to 3, a machine according to the present invention and represented by the general reference number 1, for unwinding or feeding of a film (e.g. plastic), schematically represented by reference Number 2, as used in market gardening cultivation, is intended to be towed by a traction device such as a tractor. In order not to complicate the drawings, the coupling device for the traction facility has not been shown. Preferably, this is a conventional three-point coupling.

This machine (1) consists of a chassis (4) forming a box structure mounted on wheels such as (6, 8, 10 and 12), and preferably at least four wheels, as shown; film storage or feed devices (14) are provided inside the structure (4) and advantageously consist of the film feed or storage drum (16), which is mounted to rotate with respect to the chassis.

This machine also comprises devices (18) for feeding the film from the film storage or feed drum (16), by rotation of drum (16), devices such as (20, 22) for opening a furrow in the soil at each edge (2a, 2b) of film (2); devices (24, 26) for maintaining the edges (2a, 2b) of film (2) in each furrow formed; and, devices (28, 30) for burying edges (2a, 2b) of the film (2) maintained in each furrow formed.

According to the present invention, this machine is characterized by the fact that drum (16) is mounted to rotate on three sets of two supporting rollers (32, 33); (34, 35); (36, 37); and at least one set (6, 8) of the supporting wheels (6, 8, 10, 12) and preferably at least on of wheels (6, 8), located at the front of the chassis in the towing direction, consisting of a traction wheel which, through appropriate drive mechanisms (40), drives some of the supporting rollers (such as 32 and 36) of drum (16), which then form the driver rollers for drum (16). In the design example shown, the drive devices (40) can consist of a gear wheel (42, 44) coupled to traction wheel (6, 8), which meshes with a drive transmission chain (46, 48) terminating in a lay shaft (50), which, if two traction wheels (6, 8) are used, as shown, is a common lay shaft (50) which is appropriately splined and in turn drives a transmission chain or belt, for example (52), FIG. 3, terminating in a corresponding gearwheel, such as (54), coupled to the corresponding drive roller, such as (36) simultaneously forming a supporting roller.

Advantageously, it is provided that the drive transmission devices (40) include a conventional mechanical variable speed drive (60) inserted between shaft (50) and the drive rollers such as (32, 36), thus enabling the transmission ratio between the traction wheels (6 and 8) and the drive rollers (32, 36) to be varied. It can be conceived that film (2) is drawn off the drum (16) due to rotation of the drive rollers (32, 36). Film (2) can then advantageously pass over the twisting or transfer tubes or rollers, such as (62, 64), FIG. 3, which are in this case located up-system from the supporting rollers (33, 35, 37 and 34) and/or drive rollers (32, 36) with respect to the towing direction as shown by arrow M. This film (2) passes under chassis (4) through a crosswise opening (66), the length of which is matched to the widest possible width of the film to be unwound from drum (16). Film (2) then reaches application devices (24 and 26), preferably consisting of "sealing" wheels, as shown, which maintain the film in the furrows formed by opening device (20, 22), generally consisting of disks or similar devices.

Figure 4:
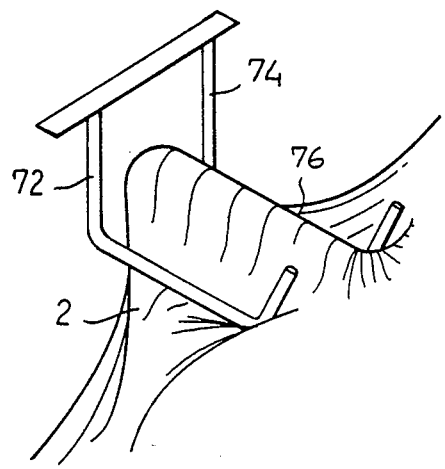
FIG. 4 is a detailed view of the film folding devices, according to the invention.

According to the invention, film folding device (70) are provided, preferably at least two devices (70) located symmetrically with respect to the machine transverse plane of symmetry. Preferably, these folding devices are located underneath chassis (4) as shown, so as to be as near the ground as possible, and therefore to holding devices (24, 26) formed by the sealing wheels. These folding devices (70) preferably comprise at least one set of three relieving tubes, which can be clearly seen from FIGS. 2 to 4, and respectively identified (72, 74 and 76). The edges of these tubes are bent to prevent tearing of film (2). A tube (76) in the drawing is located between the other two tubes, in this case (72 and 74) at a higher level and opposite and as near as possible to the film arrival point, thus enabling the film to be folded, as can be clearly seen from consulting FIG. 4. It will be understood that it is possible to have as many film folding devices (70) as there are crosswise or transverse folds to be made in the film.

According to the design option shown in FIG. 5, it is possible to provide twisting or idler tubes (62', 64') located behind the support and/or drive rollers. This enables film (2) to be passed through opening (66'), also located behind the partition forming the bottom (4b) of chassis (4), but it is then necessary to provide a supplementary idler roller (68) in front of the folding devices (70). Advantageously, this supplementary idler roller (68) can also be driven by a chain or belt, not shown, via the drive transmission system (40). Therefore, each of these options offers its own advantages, which will be fully comprehensible to the craftsman.

Figure 6:
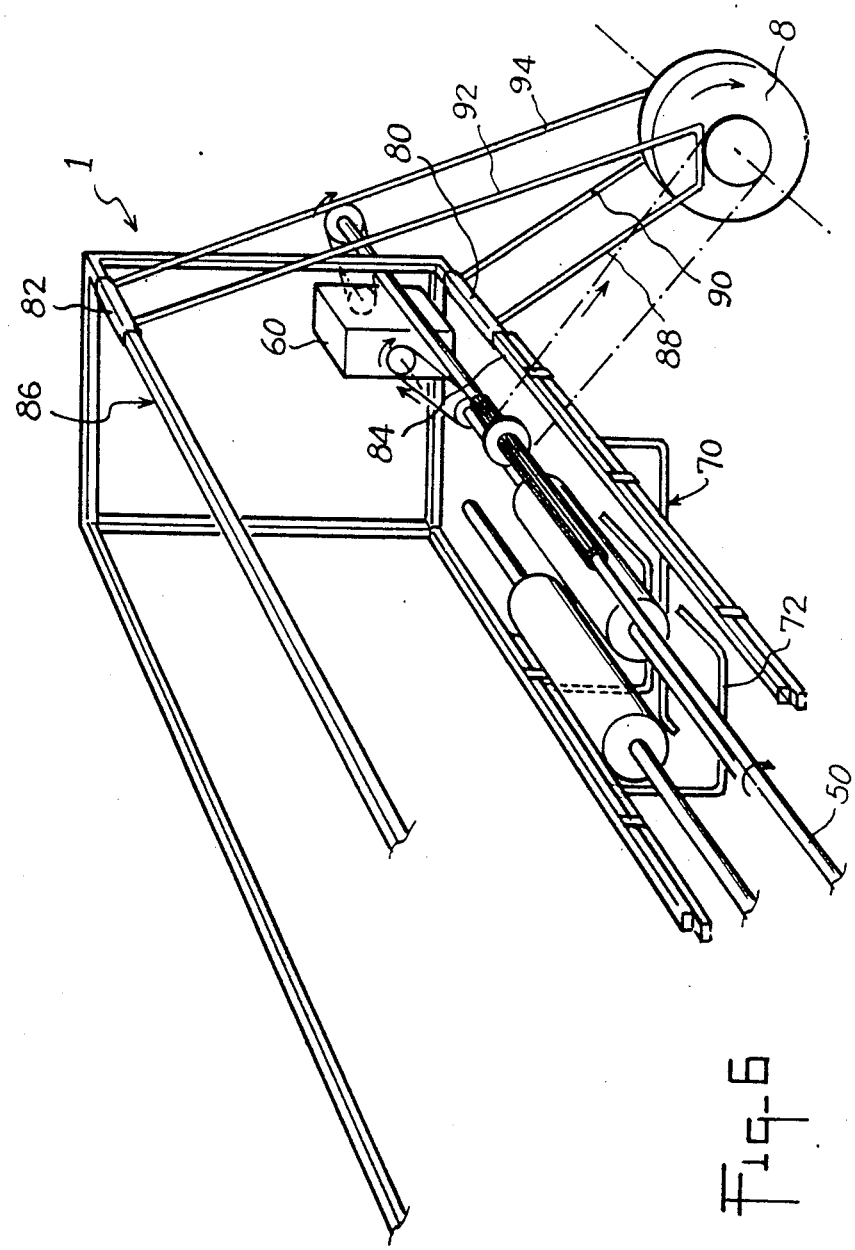

According to a design particularity, as shown in FIG. 6, devices enabling the film spread to be modified as desired are provided; these preferably consist of a carriage, defined by items such as (80, 82), which can move transversally along a corresponding guide rail, defined, for example in this case, by bars such as (84, 86) defining the longitudinal edges of chassis (4). According to the design examples shown, at least traction wheels (6 and 8) are mounted to rotate on bars (88, 90, 92 and 94) combined to form pairs, and coupled to the above-mentioned items (80, 82) forming part of the above-mentioned carriage. These devices (80, 82) being installed so as to move transversally with respect to running direction M, and being movable with respect to the lengthwise edges (84, 86) of chassis (4).

According to another preferred design method, the opening devices, such as disks (20, 22), are installed on the center line of traction wheels (6, 8) and can be moved transversally by being coupled to the same devices such as (80), FIG. 6, forming a part of the transversally movable carriage. Similarly, the folding devices can be coupled to these devices, such as (80), so as to be moved simultaneously. This also applies to devices (24, 26) retaining the edges of film (2) and the burying devices (28, 30).

Therefore, it can be seen that it is very simple to move all the devices used to modify the film spread simultaneously, thus enabling it to be correctly deposited and buried.

In particular, this is obtained by making provisions for drive wheels (6 and 8) and support wheels (10, 12) of chassis (4) to be outside the wheel base of chassis (4), as shown, while providing a high ground clearance, so that all types of terrain can be crossed.

It will be understood that the operation of a device of this type is particularly simple, and that it enables the process described above to be realised.

Naturally, the invention comprises all devices constituting technical equivalents of the devices described and their various combinations. Thus, drum (16) can be a film storage drum (2). According to an option, this drum (16) could be a transfer drum for used film accordion-folded on the ground, or on a supporting device externally fitted to chassis (4), as shown in FIG. 5 of FR-A-2 235 652. Naturally, the simplest solution, and especially for wide films, is to use a film storage drum (2) which has never been used, but reuse of film (2) can be envisaged without exceeding the scope of the invention.

I claim:

1. Plastic film feeding machine of the type used in agriculture for towing by a traction device comprising a chassis mounted on a plurality of carrying wheels, a film drum provided within the said chassis and rotating with respect to said chassis to lay film on the ground when said machine is towed, means for opening a furrow in the soil at each edge of said film, wheels for maintaining the edges of said film in each furrow as it is formed, and means for burying the film maintained in each furrow; said drum being mounted to rotate on supporting rollers and on drive rollers and at least one of said carrying wheels of said chassis being a traction wheel driving said drive rollers for said drum through a drive means which comprises a mechanical variable speed drive including means to vary the transmission ratio between said traction wheel and said drive rollers.

2. Machine according to claim 1 wherein there are two front and two rear carrying wheels and at least one of the two front wheels is a traction wheel driving a splined shaft, and which in turn causes the drive rollers of the drum to rotate.

3. Machine according to claim 2 including means for folding said film transversely so as to provide slack for the film.

4. Machine according to claim 3 including film transfer or twisting tubes located at the outlet from the supporting and/or drive rollers with respect to the feed direction of film.

5. Machine according to claim 4 including a supplementary idler roller in front of the folding device and driven by the drive transmission device.

6. Machine according to claim 5 wherein said folding device is located under said chassis and comprises at least one assembly of three relieving tubes with bent edges, to prevent tearing of the film, one of the said tubes being placed between the other two tubes at a higher level and in opposition thereto, and near the inlet of said film.

7. Machine according to claim 6 including transverse direction movement means enabling the spread of film to be altered, and which is mounted on a carriage mounted to move transversely along a guide rail.

* * * * *